United States Patent
Hirahara

(10) Patent No.: US 11,769,024 B2
(45) Date of Patent: Sep. 26, 2023

(54) LABEL ISSUING METHOD FOR LOGISTICS MANAGEMENT USING MULTIPLE CODE SYMBOLS

(71) Applicant: TOSHIBA TEC KABUSHIKI KAISHA, Tokyo (JP)

(72) Inventor: Yoshiyuki Hirahara, Mishima Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 82 days.

(21) Appl. No.: 17/466,274

(22) Filed: Sep. 3, 2021

(65) Prior Publication Data
US 2021/0397910 A1 Dec. 23, 2021

Related U.S. Application Data

(62) Division of application No. 16/952,520, filed on Nov. 19, 2020, now Pat. No. 11,481,587.

(30) Foreign Application Priority Data
Feb. 21, 2020 (JP) .................. 2020-028005

(51) Int. Cl.
*G06K 15/02* (2006.01)
*G06K 15/00* (2006.01)

(52) U.S. Cl.
CPC ......... *G06K 15/024* (2013.01); *G06K 15/002* (2013.01); *G06K 15/4045* (2013.01)

(58) Field of Classification Search
None
See application file for complete search history.

(56) References Cited

U.S. PATENT DOCUMENTS

2003/0212468 A1* 11/2003 Ishii .................. G06Q 10/06
                                                       700/116
2008/0255863 A1* 10/2008 Mack .................. G06Q 10/10
                                                       382/101
(Continued)

FOREIGN PATENT DOCUMENTS

EP   2348459 A1 *  7/2011 ....... G06K 19/06028
EP   2348459 A1    7/2011
(Continued)

OTHER PUBLICATIONS

Extended European Search Report dated Jun. 25, 2021, mailed in counterpart European Patent Application No. 21151329.6, 8 pages.

*Primary Examiner* — Miya J Williams
*Assistant Examiner* — Pawan Dhingra
(74) *Attorney, Agent, or Firm* — Kim & Stewart LLP

(57) ABSTRACT

A label issuing system includes a label issuing apparatus and a label printer. The label issuing apparatus includes a printer interface and a processor. The processor is configured to generate print data for an image including a first region with first information and a second region with a first code symbol and a second code symbol each representing the first information but being of different sizes. The processor controls the printer interface to transmit the print data to the label printer. The label printer is connectable to the printer interface and configured to print the image on a label based on the print data received through the printer interface symbol.

11 Claims, 6 Drawing Sheets

(56) References Cited

U.S. PATENT DOCUMENTS

| | | | |
|---|---|---|---|
| 2011/0180616 A1* | 7/2011 | Ito | G09F 3/0297 235/494 |
| 2011/0226857 A1* | 9/2011 | Warther | G06K 19/14 156/227 |
| 2011/0286012 A1* | 11/2011 | De Munck | G06K 15/005 358/1.6 |
| 2015/0156342 A1* | 6/2015 | Fries | B42D 15/00 358/1.15 |
| 2018/0170610 A1* | 6/2018 | Buss | B65D 5/541 |

FOREIGN PATENT DOCUMENTS

| | | | | |
|---|---|---|---|---|
| JP | 2009-234047 | * | 10/2009 | B42D 11/00 |
| JP | 2009-234047 A | | 10/2009 | |

* cited by examiner

LABEL ISSUING METHOD FOR LOGISTICS MANAGEMENT USING MULTIPLE CODE SYMBOLS

CROSS-REFERENCE TO RELATED APPLICATIONS

This application is a division of U.S. patent application Ser. No. 16/952,520, filed on Nov. 19, 2020, which is based upon and claims the benefit of priority from Japanese Patent Application No. 2020-028005, filed on Feb. 21, 2020, the entire contents of each of which are incorporated herein by reference.

FIELD

Embodiments described herein relate to a label issuing apparatus, a label issuing system, and a label issuing method.

BACKGROUND

In the related art, there is a management system that tracks products using labels with code images printed thereon. For example, one logistics system determines a delivery destination for a box by reading, with a code reader, a printed code image on a label attached to the box. The code reader decodes a code image extracted from an image of the label captured by a camera to obtain information about the box associated with the label.

However, it is often difficult for the code reader to read the information from the code image when the distance between the camera and the printed surface of the label is beyond a certain range. For example, the greater the distance between the camera and the label, the more difficult it is for the code reader to read a relatively small printed code image on the label. On the other hand, the closer the camera is to the label, the more difficult it may be for the code reader to read a relatively large printed code image on the label. In some logistics systems or the like, it may be difficult to maintain a constant distance between the camera and the label. For this reason, there is a demand for labels with printed code images that are easier for the code reader to read at various distances between the camera and the label.

DETAILED DESCRIPTION

The present disclosure is directed to providing a label issuing apparatus, a label issuing system and a label issuing method, by which a label with a code image printed thereon which is easy to read even when the label is attached to a moving object can be issued.

According to exemplary embodiments, a label issuing system includes a label issuing apparatus and a label printer. The label issuing apparatus includes a printer interface and a processor. The processor is configured to generate print data for an image including a first region with first information and a second region with a first code symbol representing the first information and a second code symbol representing the first information but of a size different than a size of the first code symbol. The processor controls the printer interface to transmit the print data. The label printer is connectable to the printer interface and configured to print the image on a label based on the print data received through the printer interface.

Hereinafter, certain example embodiments will be described with reference to the drawings.

First, the configuration of a label issuing system 1 according to one embodiment will be described.

Figure 1:
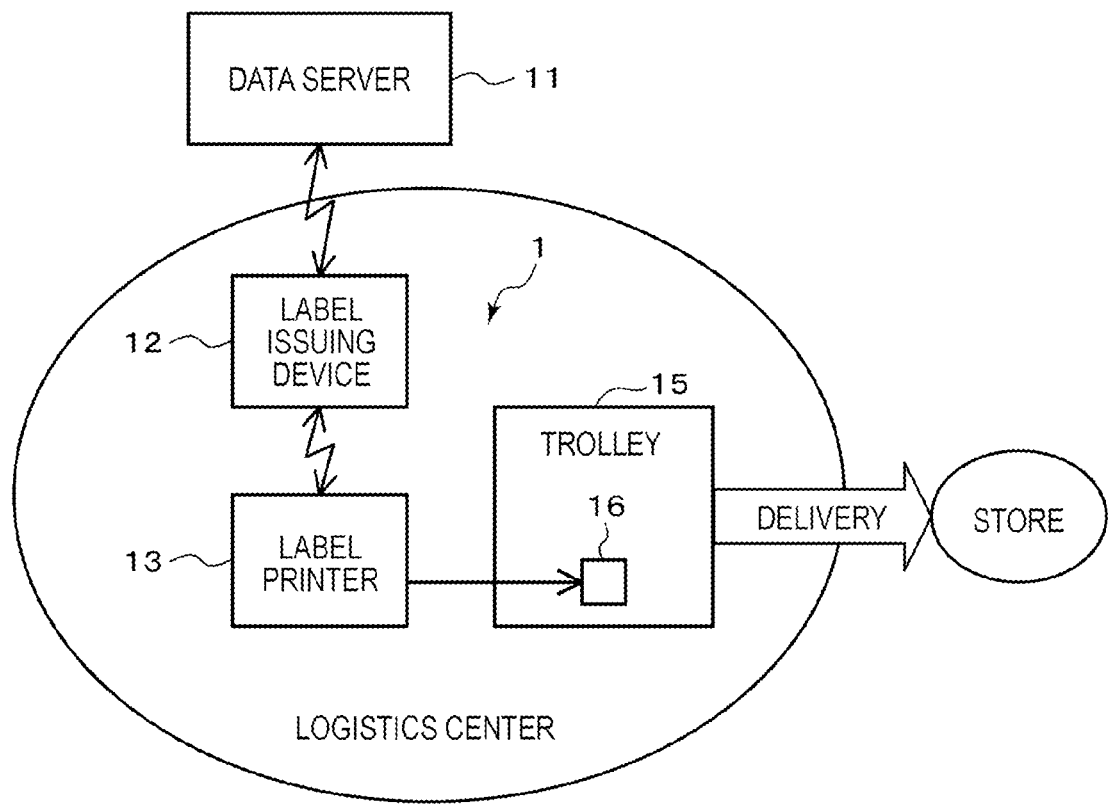
FIG. 1 is a diagram schematically of a label issuing system according to an embodiment.

FIG. 1 is a diagram showing a configuration example of the label issuing system 1 according to an embodiment.

The label issuing system 1 according to this example embodiment is a system that issues a label to be attached to a container or a case for carrying one or more articles (items) that have been sorted into the container or case based on delivery destination(s), for example. In some examples, the container or case make be a cart or trolley. However, the label issuing system 1 is not limited to just one that issues labels to be attached onto the container or the likes, but may be any applicable to various types of products, items, cargo, and carriers of such products, items, and cargo, as long as the system uses labels having code images printed thereon. The present embodiment will be described with respect to a system used in a logistics center (e.g., a distribution warehouse) that issues a label 16 to be attached onto a trolley 15 (also referred to as a container 15) for carrying products to be delivered to a particular store or stores, as shown in FIG. 1.

In the example shown in FIG. 1, the label issuing system 1 includes a data server 11, a label issuing apparatus 12, a label printer (printer) 13, and the like.

The data server 11 manages information about the logistics center, available products, trolleys, and the like. For example, the data server 11 manages information about the various trolleys (containers) that are used to carry products to be delivered to different stores. The data server 11 stores information indicating a delivery destination (client location) for a trolley in association with a trolley ID to be printed as a code image on a label issued by the label issuing apparatus 12.

The label issuing apparatus 12 controls the label printer 13 to issue a label. The label issuing apparatus 12 may be any apparatus that has a communication interface and can cause the label printer 13 to perform a process of executing a program to issue a label. For example, the label issuing apparatus 12 is configured by installing an application program on a smart phone or a tablet PC. The label issuing apparatus 12 generates a label image including code images of different sizes. The label issuing apparatus 12 supplies label image as print data to the label printer 13 to request printing of the label corresponding to the generated label image.

The label printer 13 is an apparatus that prints or otherwise issues a label 16. The label printer 13 issues a label printed with the data supplied from the label issuing apparatus 12. For example, the label printer 13 prints an image including a code image onto a front surface of the label 16. The back surface of the label 16 is attachable onto the trolley 15. In addition, the label printer 13 issues the label 16. The printed label 16 can be divided into a first region that is printed with information visually recognizable to a user (e.g., a human) and a second region that is printed with a code image. For example, the second region of the label 16, which is distinct from the first region, may be peeled off from a base (label mount) material, and the back side of the peeled off label can be attached onto the container.

Next, the configuration of the label issuing apparatus 12 of the label issuing system 1 according to an embodiment will be described.

Figure 2:
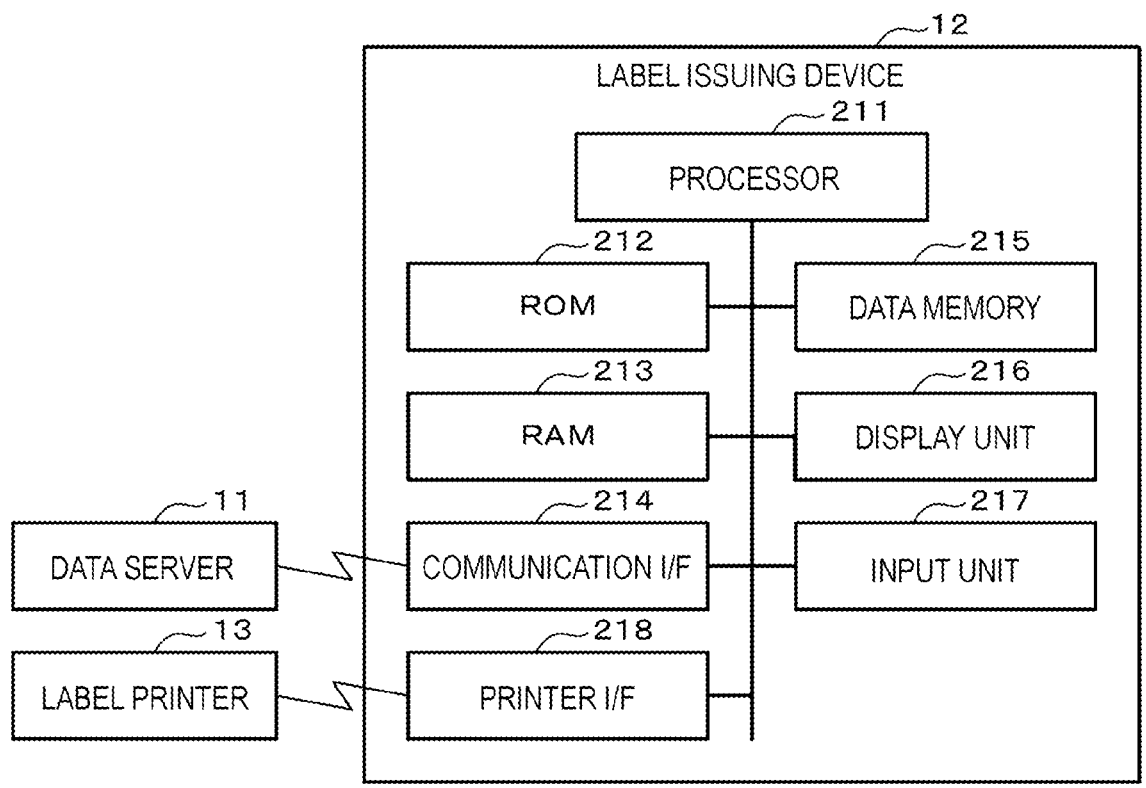
FIG. 2 is a block diagram of a label issuing apparatus according to an embodiment.

FIG. 2 is a block diagram showing a configuration example of the label issuing apparatus 12 of the label issuing system 1 according to an embodiment. As shown in FIG. 2, the label issuing apparatus 12 includes a processor 211, a ROM 212, a RAM 213, a communication interface (I/F) 214, a data memory 215, a display unit 216, an input unit 217, and a printer interface 218.

The processor 211 executes programs to perform various processes. The processor 211 executes programs (system program, application program or firmware) stored in the ROM 212, the data memory 215, or the like. For example, the processor 211 is a CPU, a MPU or a DSP. In addition, the processor 211 may be a combination of a plurality of CPUs, MPUs, DSPs, or the like. In this embodiment, the processor 211 executes an application program for label issuing process, thus causing the label printer 13 to issue a label to be attached onto the container.

The ROM 212 is a non-volatile memory used for reading data. The ROM 212 stores programs to be executed by the processor 211. Further, the ROM 212 stores data or various set values used by the processor 211 to perform various predetermined processes. The RAM 213 is a memory used for reading and writing data.

The RAM 213 is used as a working memory or the like that temporarily stores data used by the processor 211 for performing various processes.

The communication interface 214 is an interface for communication with the data server 11. For example, the communication interface 214 is a network interface for communication with the data server 11 via a secure local network.

The printer interface (first communication interface) 218 is an interface for communication with the label printer 13. For example, the printer interface 218 is an interface for communication with the label printer 13 by wireless communication. Note that the label issuing apparatus 12 may communicate with the label printer 13 via the communication interface 214. In this case, the printer interface 218 may be omitted.

The data memory 215 is a rewritable non-volatile memory that stores various data. For example, the data memory 215 stores an application program (label issuing program) for the label issuing process to be executed by the processor 211. Further, the data memory 215 may store the programs or the set values to be executed by the processor 211. In addition, the data memory 215 may store the data or the like generated by the process at the processor 211.

The display unit 216 is a display device that displays information. For example, the display unit 216 displays information to be presented to an operator. The input unit 217 is a device that receives an instruction input from the operator. The input unit 217 notifies the processor 211 of a content of the instruction input from the operator. For example, the input unit 217 includes a touch panel, numeric keys, a keyboard, a mouse and the like. The display unit 216 and the input unit 217 are configured with a display with a touch panel, or the like.

Next, the configuration of the label printer 13 of the label issuing system 1 according to an embodiment will be described.

Figure 3:
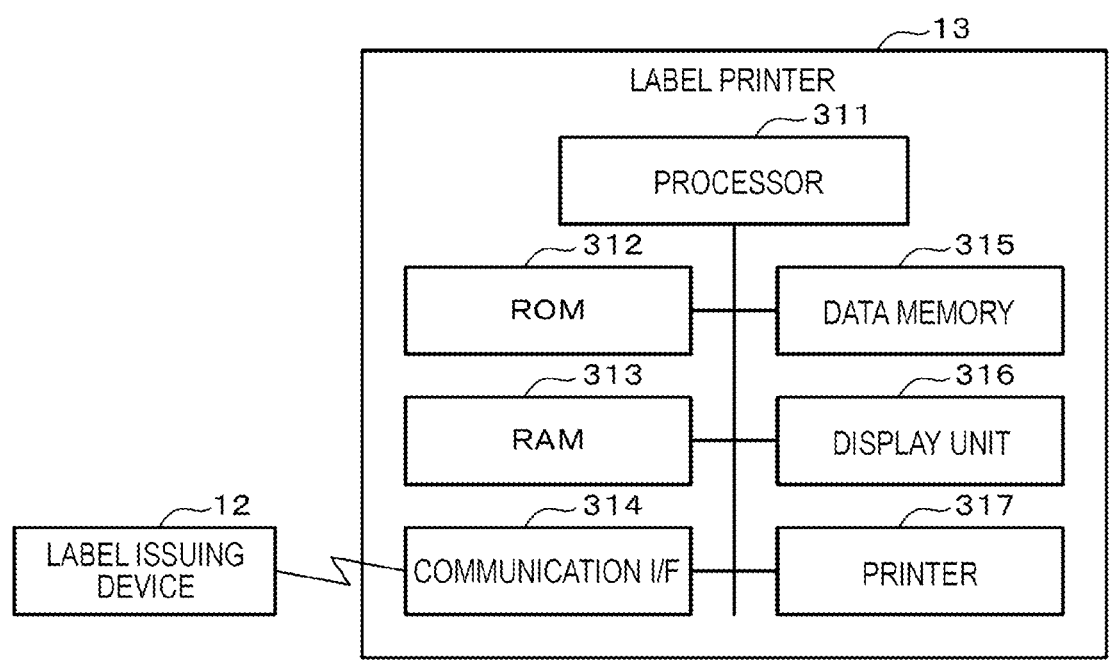
FIG. 3 is a block diagram of a label printer according to an embodiment.

FIG. 3 is a block diagram showing a configuration example of the label printer 13 of the label issuing system 1 according to an embodiment.

As shown in FIG. 3, the label printer 13 includes a processor 311, a ROM 312, a RAM 313, a communication interface (I/F) 314, a data memory 315, a display unit 316, and a printer 317.

The processor 311 executes programs to perform various processes. The processor 311 executes programs (system program, application program or firmware) stored in the ROM 312, the data memory 315, or the like. For example, the processor 311 is a CPU, a MPU or a DSP.

The ROM 312 is a non-volatile memory used for reading data. The ROM 312 stores programs to be executed by the processor 311. Further, the ROM 312 stores data or various set values used by the processor 311 to perform various predetermined processes. The RAM 313 is a memory used for reading and writing data.

The RAM 313 is used as a working memory or the like that temporarily stores data used by the processor 311 for performing various processes.

The communication interface 314 is an interface for communication with the label issuing apparatus 12. The communication interface 314 may be wireless communication type or wired communication type. For example, the communication interface 314 is a network interface that communicates with the label issuing apparatus 12 by wireless communication.

The data memory 315 is a rewritable non-volatile memory that stores various data. Further, the data memory 315 may store the programs or the set values to be executed by the processor 311.

The display unit 316 is a display device that displays information. For example, the display unit 316 displays information indicating a printing status. The display unit 316 may be configured with a display with a touch panel, or the like, as an input unit for the operator to input an instruction.

The printer 317 prints an image on a medium used as a label. The printer 317 prints an image on a surface of the medium to be used as a label, based on the print data supplied from the processor 311. For example, the printer 317 prints an image including a code image on the surface of the medium to be used as a label. A back surface of the medium is attachable onto a container (e.g., a trolley) or the like, as described above. Further, the printer 317 prints the first region and the second region on a medium permitting these regions to be separated from each other as described above. The printer 317 prints information visually recognizable to a user in the first region and prints a plurality of code images of different sizes in the second region. In some examples, the printer 317 may incorporate a processing mechanism to process the first region and the second region of the label 16 so that these regions can be more easily separated from each other.

Note that the label printer 13 may execute the label issuing process by incorporating the label issuing apparatus 12 therein. That is, the label issuing apparatus 12 and the label printer 13 may be a single, integrated apparatus in some examples.

Further, the label printer 13 may be carried around by a worker as hand-held or mobile device, or may be a printer installed at a predetermined position.

Next, the configuration of the label 16 issued by the label printer 13 will be described.

Figure 4:
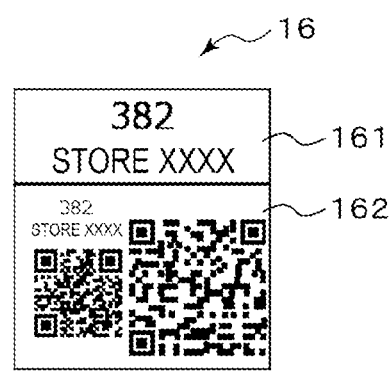
FIG. 4 is a diagram showing a first configuration example of a label issued by a label printer according to an embodiment.
Figure 5:
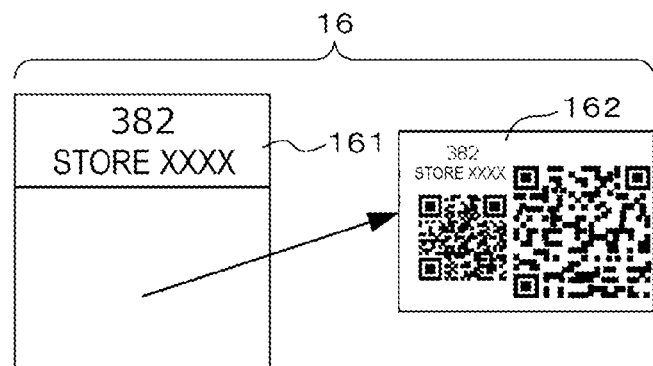
FIG. 5 is a diagram showing additional aspects of a first configuration example of a label issued by a label printer according to an embodiment.

FIG. 4 shows the first configuration example of a label 16 issued by the label printer 13. FIG. 5 depicts a state of label 16 in which the first region 161 and the second region 162 of the first configuration example (shown in FIG. 4) have been separated from each other.

As shown in FIG. 4, the label 16 of the first configuration example has a first region 161 and a second region 162. The information visually recognizable to a user is printed in the first region 161. In the example shown in FIG. 4, a name of a store ("STORE") that is the delivery destination for items in the trolley 15, and a store ID ("XXXX") of the store are printed as a text in the first region 161. A trolley ID ("382") is likewise printed as text in the first region 161. This allows a user such as a worker to confirm which store is the delivery destination by visually observing the first region 161 of the label 16.

In the second region 162 of the first configuration example, a two code images of different sizes are printed. In other examples, a plurality of code images of different sizes can be printed in a second region 162, but each code image is code information (e.g., a two-dimensional code) indicating the same information. In the example shown in FIG. 4, two code images indicating the name of the destination store and the trolley ID are printed in different sizes side by side in the horizontal direction of the second region 162.

A code reader may recognize the destination store and the trolley ID by reading any one of the plurality of code images printed in the second region 162 of the label 16 shown in FIG. 4. For example, the closer the code reader is to the second region 162 of the label 16, the more difficult it may be to read a large printed code image, and so it may be easier to read the smaller printed code image in the second region 162. Likewise, the farther the code reader is away from the second region 162 of the label 16, the more difficult it may be to read a small printed code image, and thus it may be easier to read the larger printed code image. That is, the label 16 is printed with code images of different sizes, so at least one code image is likely to be readable even when distance from the code reader varies.

In addition, in the label 16, the second region 162 part is separated from the first region 161, as shown in FIG. 5. In the example shown in FIG. 5, the second region 162 part of the label 16 is peeled off from the base part where the first region 161 is included, and used. Further, in the second region 162 part of the label 16, the surface (back surface) peeled off from the base is a surface that is attachable onto the trolley 15. Accordingly, the entire label 16 may be attached onto the trolley 15, and then the second region 162 part of the label 16 may be peeled off and separated from the base on which the first region 161 was included. The second region 162 part that is peeled off from the base is a printing surface for the plurality of code images of different sizes and can be attached to the trolley 15 at a predetermined position.

Next, modifications of the label 16 issued by the label printer 13 will be described.

Figure 6:
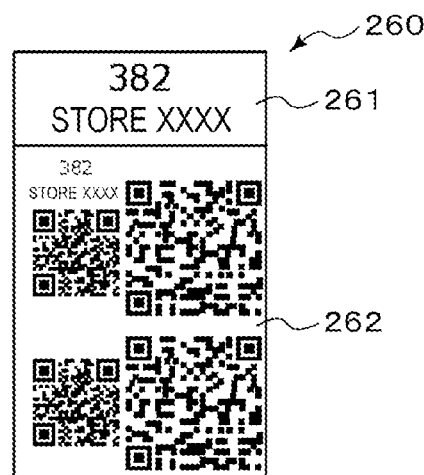
FIG. 6 is a diagram showing a second configuration example of a label issued by a label printer according to an embodiment.
Figure 7:
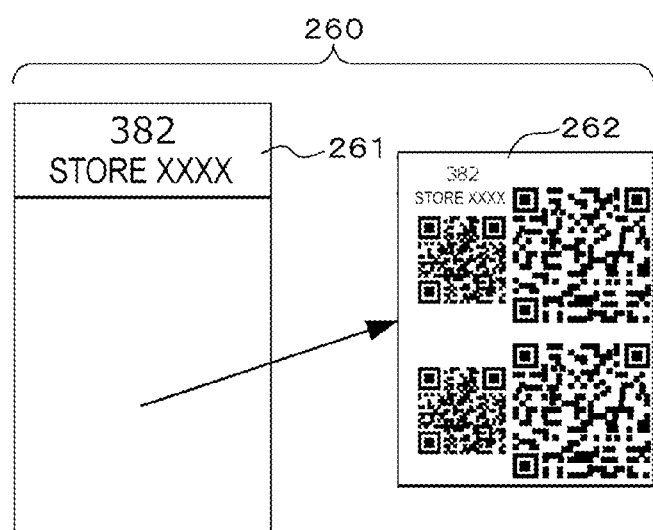
FIG. 7 is a diagram showing additional aspects of a second configuration example of a label issued by a label printer according to an embodiment.

FIG. 6 shows a second configuration example of a label 260 issued by the label printer 13. Further, FIG. 7 is a diagram showing a state in which the first region 261 and the second region 262 of the label 260 of the second configuration example shown in FIG. 6 are separated from each other.

The label 260 of the second configuration example is a modification of the label 16 of the first configuration example shown in FIGS. 4 and 5 described above. As shown in FIG. 6, the label 260 of the second configuration example has a first region 261 and a second region 262, likewise the first region 161 and the second region 162 of the first configuration example. Information visually recognizable to a user is printed in the first region 261 of the label 260 of the second configuration example. In the example shown in FIG. 6, the name of the store which is the delivery destination and the store ID of the store are printed as a text in the first region 261. This allows a user such as a worker to confirm the store which is the delivery destination by visually observing the first region 261 of the label 260.

In the second region 262 of the label 260 of the second configuration example, multiple sets of code images of different sizes (each set can also be referred to as a code image group) are printed. All the code images printed in a second region 262 are code information (e.g., a two-dimensional code) indicating the name of the store, which is a delivery destination, and a trolley ID. The example shown in FIG. 6 is an example of printing two sets of different sized code information in the second region 262. The two sets are adjacent to one another in the vertical direction. In this example, each set (also referred to as a code image group) includes two code images of different sizes arranged side by side in the horizontal direction. That is, in the label 16 of the second configuration example, the sets of the code images of different sizes are printed in the second region 262 side by side in the vertical direction.

The code reader may recognize the store and the container ID by reading any one of the plurality of code images printed on the second region 262 of the label 260 of the second configuration example. That is, in the label 260 of the second configuration example, a plurality of code images of different sizes is printed in the second region 262. As a result, the code reader may easily read any of the code images printed in the second region 262 even with the varying relative distance between the label 260 and the second region 262.

Furthermore, in the label 260 of the second configuration example, a plurality of code image groups is printed side by side in the vertical direction in the second region 262. As a result, the code reader may easily read any of the code images even when the position of the second region 262 is changed in the vertical direction with respect to a read position of the code image.

In addition, as shown in FIG. 7, in the label 260 of the second configuration example, the second region 262 part is separated from the first region 261 as in the first configuration example. For example, the second region 262 part of the label 260 is peeled off from the base part with the first region 261 and used. Further, in the second region 262 part of the label 260, the back surface that has been peeled off from the base is attachable onto the trolley 15. Thus, the entire label 260 may be attached onto the trolley 15, and then the second region 262 part of the label 260 may be separately peeled off and separated from the base and the first region 261. The second region 262 part that is peeled off is a printing surface for the plurality of code images of different sizes and can be attached to the trolley 15 at predetermined positions.

Operations will be described herein by assuming that the code reader installed at a fixed position reads the second region 262 of the label 260 attached onto a container (e.g., trolley 15) that can be moved in the horizontal direction. In such operations, the relative distance between the container and the code reader may be varied, or the position where the second region 162 is attached onto the container may be varied. However, even in such cases, the code reader may still easily read at least one of the different sized code images printed on the second region 162 of the label 260.

Next, the application example of a label issued by the label issuing system 1 according to an embodiment will be described.

Figure 8:
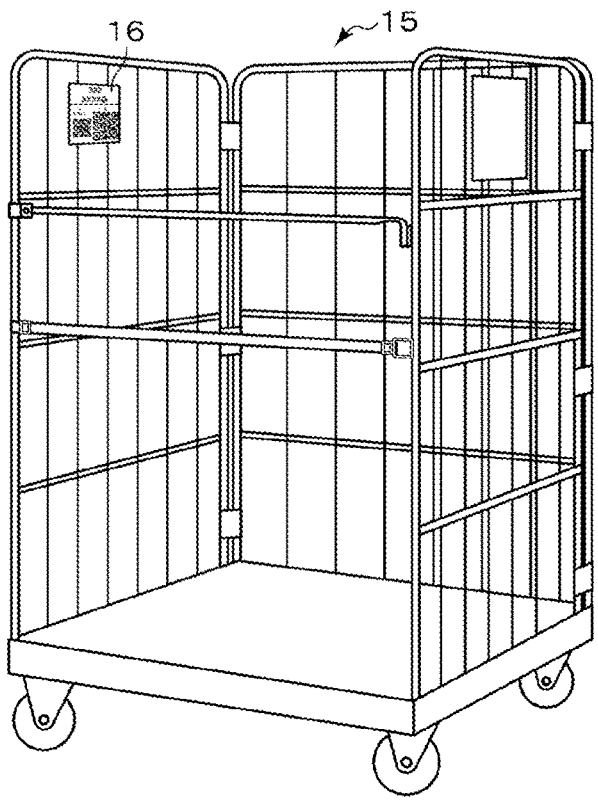
FIG. 8 is a diagram for explaining an application example of a label issued by a label printer according to an embodiment.
Figure 9:
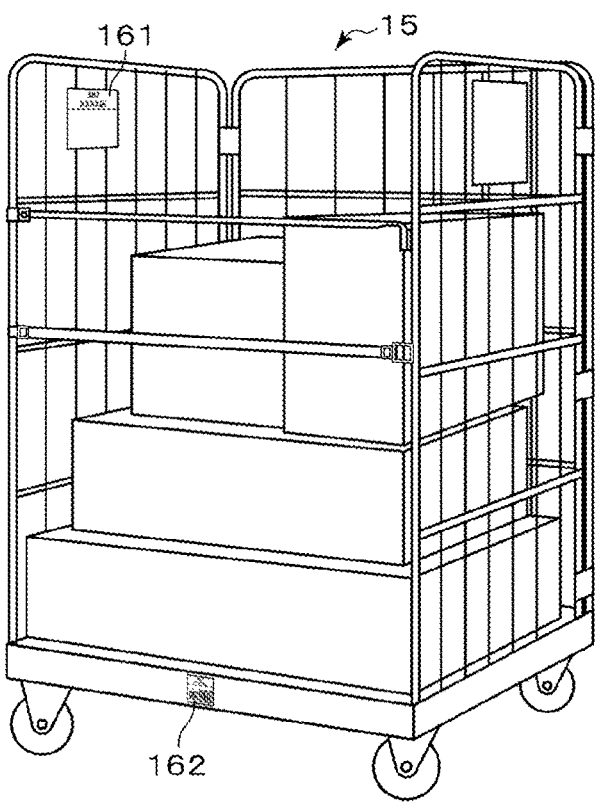
FIG. 9 is a diagram for explaining an application example of a label issued by the label printer according to an embodiment.

FIGS. 8 and 9 are diagrams for explaining the application example of a label issued by the label issuing system 1 according to an embodiment. In the following description, a label 16 according to the first configuration example is primarily described as one example. However, the following description is also applicable to other labels including, specifically, a label 260 according to the second configuration example.

The label issuing apparatus 12 generates the print data of the label 16 as shown in FIG. 4 (or similarly a label 260 depicted in FIG. 6) by the label issuing process described below. The label printer 13 prints the label 16 having the first region 161 and the second region 162 as shown in FIG. 4 (or similarly for the regions 261 and 262 of label 260 depicted in FIG. 6) based on the print data supplied from the label issuing apparatus 12.

The label 16 issued by the label printer 13 is attached onto the trolley 15 with the first region 161 and the second region 162 still together as shown in FIG. 8. For example, the label 16 is attached to such a position that a user, such as a worker who stacks products on the trolley 15 or a worker who moves the trolley 15, may easily see the text information printed in the first region 161.

When the work of stacking the products on the trolley having the particular label 16 attached thereon is completed, the second region 162 of the label 16 is separated from the first region 161, as shown in FIG. 9. As a result, the loaded trolley 15 (the work of stacking the products has been completed) still has the first region 161 of the label 16 attached, while the second region 162 of the label 16 has been separated from the label 16. With this use of the separable parts of the label 16, a user may confirm that the work of stacking the products has been completed if the second region 162 has already been separated from the first region 161 of the label 16 on the trolley 15. Likewise, a user may confirm that the work of stacking the products on the trolley 15 is not completed if the second region 162 has not yet been separated from the first region 161 of the label 16 on the trolley 15.

In some examples, the second region 162 can be separated from the first region 161 and then attached to a pre-designated position on the trolley 15. For example, the worker peels off the second region 162 portion of the label 16 from the base on which the first region 161 is also included, and then attaches the second region 162 portion of the label 16 to a pre-designated position on the trolley 15. The second region 162 of the label 16 can be attached to the trolley 15 at a position where the code reader may more easily read information. For example, a code reader used for tracking trolleys and/or products can be positioned to read a printed code image in the second region 162 portion of the label 16 when the trolley 15 passes a predetermined position along a passage (or at gate) through which the trolley 15 travels.

In the example shown in FIG. 9, the second region 162 portion of the label 16 is attached onto a side surface of a lower frame of the trolley 15. This lower frame may comprise a table-like member to which tires or wheels of trolley 15 are attached/mounted. In this case, the code reader is installed at a height corresponding to the expected height of the lower frame of the trolley 15. The second region 162 of the label 16 attached to the side surface of the trolley 15 can be moved without being changed in height from the floor surface. Accordingly, a plurality of code images of different sizes arranged side by side in the horizontal direction (in this context, the horizontal direction is parallel to a floor surface on which trolley 15 travels) may be sequentially read by the code reader installed along the passage where the trolley 15 is moved.

In this example, since the trolley 15 is manually moved by a worker, the actual moving position can be changed while passing through the passage or gate. When the moving position of a trolley 15 varies trolley to trolley or during travel, the relative distance between the printed code image on the second region 162 attached to the trolley 15 and the code reader will be changed. However, even if the relative distance between the second region 162 and the code reader is changed, the code reader may still read a code image having a size that is easy to read from among the plurality of code images with different sizes.

Further, when there are multiple types of containers used in the logistics center or the like, the height of the attachment position (that is, a height from the floor surface or the like) where the second region 162 of the label 16 is attached may not be the same for all types of containers. Thus, the second region 162 of the labels 16 may be attached at varying heights on the trolley 15 if the labels 16 are manually attached to trolleys 15 by a user (worker). When the height of the attachment position of the second region 162 of a label 16 with respect to the trolley 15 is not constant, the code images arranged side by side in the horizontal direction can be difficult to read with a code reader that is at a fixed read position.

However, for the second region 262 of the label 260 of the second configuration example, the code image groups formed of code images arranged side by side in the horizontal direction are also printed adjacent to each other in the vertical direction in multiple stages. In the second region 262 of the label 260 shown in FIG. 7, at least one of the code images arranged in the vertical direction may be reliably read by the code reader even though the height of the attachment position is not constant. That is, the label 260 of the second configuration example makes it easier to read the printed code image in the second region 262, not only when the relative distance between label and reader is changed, but also when the height of the attachment position is changed.

Next, the operation of the label issuing apparatus 12 of the label issuing system 1 according to an embodiment will be described.

Figure 10:
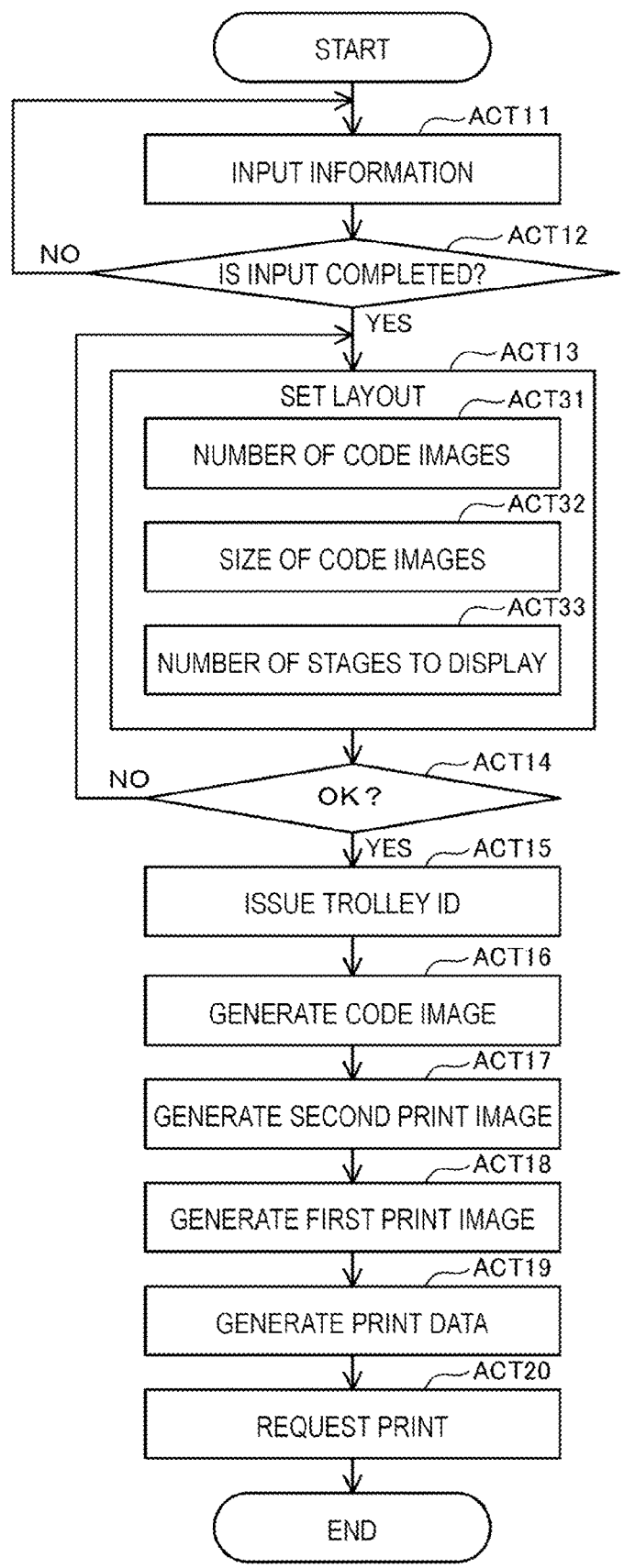
FIG. 10 is a flowchart of an operation example of a label issuing apparatus according to an embodiment.

FIG. 10 is a flowchart of an operation example of the label issuing process by the label issuing apparatus 12.

In the label issuing process, the processor 211 of the label issuing apparatus 12 acquires information to be printed on the label 16 to be issued (ACT 11). For example, a worker inputs, by the input unit 217 of the label issuing apparatus 1, an instruction for the issuing process of the label 16 to be attached onto the trolley 15. The processor 211 receives the instruction to start the label issuing process input to the input unit 217.

Upon receiving the instruction to start the label issuing process, the processor 211 displays, on the display unit 216, an input screen for inputting information to be printed on the label 16. In this case, the processor 211 acquires information input via the input unit 217 according to an input screen as the information to be printed on the label. The information to be printed on the label 16 includes a store ID that indicates the store (or other client) that is the delivery destination and a type of container. Note that in order to manage various workers, the processor 211 may request input of a worker ID that specifies the worker supplying the information to be printed. In this case, the processor 211 holds the worker ID in association with the information such as the store ID and the type of container that are input.

After acquiring the information to be printed on the label (ACT 12, YES), the processor 211 sets the layout of a plurality of code images to be printed on the second region 162 of the label 16 (ACT 13). The processor 211 executes a layout setting process for setting a layout based on layout information indicating the number, size and arrangement of respective code images.

For example, the processor 211 acquires the layout information designated by the worker using the input unit 217 or the like. In this case, the processor 211 sets the layout according to the layout information specified by the worker. In addition, the processor 211 may acquire the layout information stored in the data memory 215 in advance. In this case, the processor 211 sets the layout according to the layout information acquired from the data memory 215. In addition, the data memory 215 may store layout information according to the type of trolley or other cargo container type. In this case, the processor 211 may acquire the layout information according to the type of a specified trolley or cargo container from the data memory 215.

Here, an example of the layout setting process shown in ACT 13 of FIG. 10 will be described.

The processor 211 sets the number of code images to be displayed in different sizes along the horizontal direction based on the acquired layout information (ACT31). When the number of code images is set, the processor 211 sets the size of each code image to be displayed in the horizontal direction (ACT32). For example, the processor 211 sets the size of each code image according to the total number of code images to be displayed side by side along the horizontal direction. In addition, the processor 211 may set the size for each code image to that designated by a worker using the input unit 217.

In addition, the processor 211 sets the number of display stages (code image groups) to arrange in the vertical direction based on the layout information (ACT33). For example, when the number of display stages is two, the processor 211 sets the layout to display the code image group side by side in the horizontal direction such that two different sets can be displayed along the vertical direction, as shown in FIG. 6.

When setting the code image layout is completed (ACT 14, YES), the processor 211 issues a trolley ID for identifying the particular trolley 15 to which the label 16 is to be attached (ACT 15). For example, the processor 211 issues the trolley ID by a preset algorithm. In other examples, the processor 211 may request data server 11 to issue the trolley ID.

When the trolley ID is issued, the processor 211 generates a code image coded with the information such as store ID, trolley ID, and type of trolley (ACT 16). The code image is code information in which information including destination information (e.g., a store ID) is coded. For example, the code image is a two-dimensional code. In general, the code image may be of any type/format, as long as the code image may be read by the code reader as incorporating the same information regardless of image size, that is whether the code image is enlarged or reduced.

When the code image is generated, the processor 211 generates a printed image (referred to as a second printed image) for the second region 162 (ACT 17). The processor 211 generates the second printed image by arranging a plurality of code images according to the layout settings described above. For example, the processor 211 enlarges or reduces the code image and generates a plurality of code images of different sizes to be arranged side by side in the horizontal direction. Furthermore, the processor 211 arranges the code image groups into a predetermined number of display stages along the vertical direction. For example, when the number of display stages is two, the processor 211 generates a second printed image in which the code image groups are arranged side by side and up and down.

In addition, the processor 211 generates a printed image (referred to as a first printed image) to be printed in the first region 161 (ACT 18). The first printed image may be any image, as long as the first printed image shows information that may be visually confirmed by the user. For example, in the example shown in FIG. 4, the store ID ("XXXX") (store number) and the name of the store ("STORE") are printed in the first region 161. In this case, the processor 211 generates the first printed image that shows the store ID and the name of the store as a text.

When the first printed image and the second printed image are generated, the processor 211 generates print data to be supplied to the label printer 13 (ACT 19). For example, the processor 211 generates the print data by converting the printed image, which is a combination of the first printed image and the second printed image, into a data format suitable for printing.

When the print data is generated, the processor 211 requests the printing of the label 16 by supplying the print data to the label printer 13 (ACT 20). Furthermore, the processor 211 may notify the data server 11 of the information (e.g., container ID and store ID) about the container printed on the label printer 13.

Next, the operation of the label printer 13 of the label issuing system 1 according to an embodiment will be described.

Figure 11:
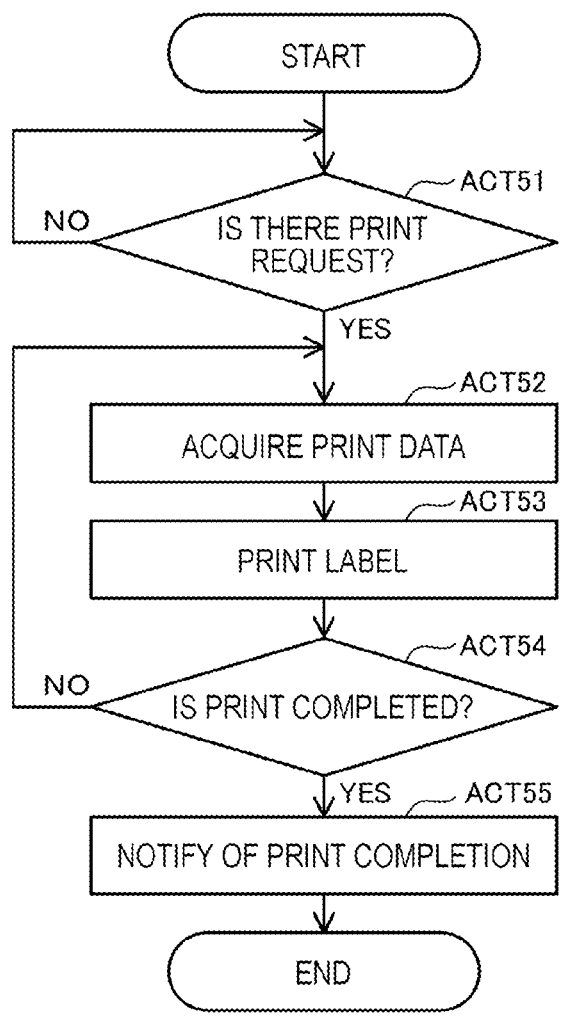
FIG. 11 is a flowchart of an operation example of a label printer according to an embodiment.

FIG. 11 is a flowchart of an operation example of the label printer 13.

The label printer 13 executes a printing (or issuing) operation of the label in response to a request from the label issuing apparatus 12. That is, the processor 311 of the label printer 13 receives the print request from the label issuing apparatus 12 by the communication I/F 314 (ACT 51). When receiving the print request from the label issuing apparatus 12 (ACT 51, YES), the processor 311 acquires the print data received together with the print request (ACT 52). The print data received by the communication I/F 314 is held in the RAM 213 or the data memory 215.

The processor 311 drives the printer 317 based on the acquired print data and executes the printing of the label (ACT 53). For example, in response to the print start instruction from the processor 211, the printer 317 picks up a medium to be used as a label. The printer 317 prints the print data supplied from the processor 211 on the picked-up medium. As a result, the printer 317 generates the label 16 on which the print image as shown in FIG. 4 (or similarly for FIG. 6) is printed.

The processor 311 detects the completion of the label printing based on a signal indicating completion of the printing from the printer 317 (ACT 54). When it is detected that the label printing is completed (ACT 54, YES), the processor 311 causes the display unit 316 to display that the label printing is completed. When the label printing is completed, the processor 311 notifies the label issuing apparatus 12, which is the source of the print request, of the label printing the completion (ACT 55).

As described above, the label issuing system according to an embodiment issues a label printed with an image including a plurality of code images coded with specific information, such as a container ID, in different sizes. The label issued by such a label issuing system includes code images of different sizes, one of which may be easily read by the code reader even when distance to the code reader varies. As a result, it is possible to provide a label with a printed code image that may be reliably read by the code reader even when the object (e.g., a trolley or other container) with the label attached thereto is moved.

Note that, in the embodiment described above, the description is given by referring to an example in which the program executed by the processor is stored in advance in the memory inside the apparatus. However, in some examples, the program executed by the processor may be downloaded from the network onto the apparatus, or may be installed from a non-transitory, computer readable storage medium onto the apparatus. In general, the storage medium may be any type of storage medium as long as the storage medium may store the program and may be read by the apparatus. In addition, the functions that are obtained by installation or downloading of the program may be achieved in cooperation with an Operating System (OS) or the like separately provided in the apparatus.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A label issuing method for logistics management, comprising:
    printing an image on a label, the label including a first part on which a first region of the image is printed and a second part on which a second region of the image is printed, the second part being detachable from the first part, the first region of the image including a first text of destination information and a second text of a container ID, the second region of the image including a first code symbol representing the destination information and the container ID and a second code symbol representing information identical to that of the first code symbol, the second code symbol being larger than the first code symbol, each of the first and second texts being aligned in a first direction, and the first and second code symbols being adjacent to each other in the first direction; and
    attaching the label to a container at a first position.

2. The method according to claim 1, further comprising:
    loading goods on the container; and
    after the loading, detaching the second part of the label from the first part, and then attaching the second part to a second position on the container at a predetermined height, such that the first direction is aligned in a horizontal direction.

3. The method according to claim 2, further comprising:
    reading the second part of the label at the second position with a code reader at the predetermined height.

4. The method according to claim 3, wherein said reading of the second part of the label comprises:
    reading one of the first or second code symbols based on the distance between the code reader and the second position.

5. The method according to claim 1, wherein
    the first region is adjacent to the second region in a second direction intersecting the first direction.

6. The method according to claim 5, wherein the image further includes a third region adjacent to the second region in the second direction and including a third code symbol identical to the first code symbol and a fourth code symbol identical to the second code symbol.

7. The method according to claim 1, wherein the label includes an adhesive backing on a backside surface and a peelable portion on a frontside surface on which the image is printable.

8. The method according to claim 1, wherein the first code symbol is a two-dimensional code.

9. The method according to claim 1, further comprising:
    receiving a user input of the destination information via a user interface.

10. The method according to claim 9, further comprising:
    setting a layout of code symbols in the second region based on a cargo container type specified via the user interface.

11. The method according to claim 1, wherein each of the first and second code symbols is an image of a two-dimensional code symbol.

* * * * *